Sept. 28, 1943.     A. J. SORENSEN     2,330,526
POLARIZED RELAY CONTROL
Filed July 16, 1941
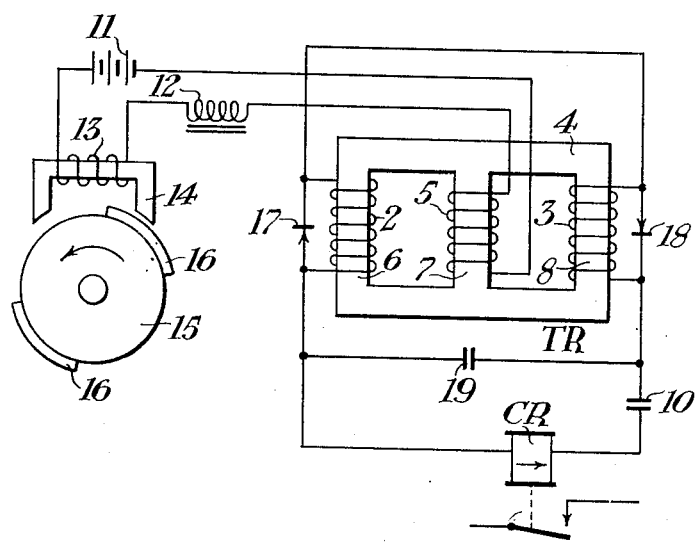
INVENTOR
*Andrew J. Sorensen.*
BY
HIS ATTORNEY Patented Sept. 28, 1943

2,330,526

UNITED STATES PATENT OFFICE 2,330,526

POLARIZED RELAY CONTROL

Andrew J. Sorensen, Edgewood, Pa., assignor to The Union Switch & Signal Company, Swissvale, Pa., a corporation of Pennsylvania Application July 16, 1941, Serial No. 402,605

4 Claims. (Cl. 175—320)

My invention relates to electrical apparatus, and it has particular reference to electrical apparatus involving rectifying means for supplying unidirectional current from a source of alternating or periodically varying current to a direct current load. More particularly, my invention relates to means for supplying unidirectional current from an alternating current source to an energy storing device and arranged to have a relatively low resistance to the flow of current from the energy storing device.

It has been proposed heretofore to charge an energy storing device, connected in series with a direct current load, with direct current from a source of alternating current through rectifying means arranged to exhibit a low resistance to current flowing from the source to the device but exhibiting a relatively high resistance to the flow of current from the device during its discharge. In order to permit the device to discharge through the load, it has therefore been necessary to provide a leakage resistance in multiple with the energy storing device. Such an arrangement is relatively inefficient since the resistor must have a relatively low value in order to permit the energy storing device to discharge, and therefore provides a low resistance path in multiple with the device through which a portion of the charging current is shunted away from the device.

In view of the foregoing and other important considerations, it is an object of my invention to provide means for supplying unidirectional current to an energy storing device from a source of alternating current through rectifying means so arranged as to exhibit a relatively low resistance both to the flow of current from the source to the device and to a flow of current from the device.

Another object is the provision of novel and improved means for supplying unidirectional current to a direct current load from a source of alternating or periodically varying current.

A further object is to provide a circuit connecting a source of alternating current to direct current load and incorporating asymmetrical units which function to cause unidirectional current to be supplied to the load but which do not impede the flow of current from the load during a discharge from the load.

An additional object is the provision of a novel and improved transformer-rectifier combination for supplying unidirectional energy from a source of alternating energy to a direct current load and arranged to exhibit a low resistance to the discharge of current from the load through the transformer windings as well as the usual low resistance to the flow of current from the transformer windings to the load.

Another object is the provision of a novel and improved transformer-rectifier combination for supplying unidirectional current to a direct current load from a source of periodically varying or alternating current.

The above-mentioned and other important objects and characteristic features of my invention which will become readily apparent from the following description, are attained in accordance with my invention by supplying energy to a direct current load over a circuit including two output windings disposed respectively on two magnetic circuits supplied with flux by means energized from the source of alternating or periodically varying current, the two output windings being connected in series opposition so that voltages of opposite instantaneous polarities are induced therein due to flux in the magnetic circuits, and by connecting asymmetrical units one in multiple with each output winding and poled to provide a shunt path for current of a given preselected polarity induced in either output winding.

I shall describe one form of apparatus embodying my invention, and shall then point out the novel features thereof in claims.

The accompanying drawing is a diagrammatic view illustrating a preferred form of apparatus embodying my invention.

Referring to the drawing, the reference character TR designates a transformer-rectifier combination embodying my invention and comprising two magnetic circuits, each supplied with flux by means energized from a source of alternating or periodically varying current, and each provided with an output winding designated respectively by the reference characters 2 and 3. The two magnetic circuits may be entirely separate and comprise two isolated cores each provided with a primary winding connected to the source and an output or secondary winding, or as shown the magnetic circuits may have a portion of a magnetizable core 4 in common. In the particular transformer arrangement illustrated in the drawing, the core 4 comprises a plurality of legs connected together at each end and provided with a primary or supply winding 5 arranged on the core in such manner that when energized, winding 5 circulates flux through a common core leg 7 and thence through the other two legs 6 and 8 in multiple. The two output windings 2 and 3 are disposed respectively on the two other legs 6 and 8, and are connected in series opposition to a direct current load comprising an energy storing device, such as a condenser 10 connected in series with an electroresponsive device here shown as a relay CR responsive only to current of a given relative polarity.

Winding 5 may be energized from a source of alternating current, or as shown the winding may be energized from a source of periodically varying current comprising, for example, a battery 11 connected to primary winding 5 through a circuit including a reactor 12 and a winding 13 disposed on a magnetizable core 14. Associated with winding 13 and core 14 are suitable means for pulsing or periodically varying the magnitude of current flowing in the circuit. These means may, for example, comprise a rotatable shaft or wheel 15 provided with magnetizable lugs or segments 16 brought into and out of the magnetic field of winding 13 by rotation of the shaft. When a segment 16 is brought into the field of the winding and bridges the pole pieces of core 14, the impedance of the winding is caused to become relatively high to thereby limit the flow of current to winding 5, and when the segment is removed from the field of winding 13 and no longer bridges the pole pieces of core 14, the impedance of winding 13 decreases and the current supplied by battery 11 to winding 5 is caused to increase in value. This periodic variation in current flowing in the circuit of course occurs at a rate proportional to the rate of rotation of shaft 15, and causes winding 5 to circulate through core 4 flux periodically varying in direction and character, whereupon alternating electromotive forces are caused to be induced in the output windings 2 and 3.

Each output winding 2 and 3 of the transformer-rectifier combination has associated therewith in multiple a unidirectional conductor or asymmetrical unit, designated by the reference characters 17 and 18, respectively, poled to provide a shunt path for current of a corresponding given polarity induced in either output winding. That is to say, with primary winding 5 energized by periodically varying or alternating current, the series opposition connection of the two output windings results in the induction of voltages of opposite instantaneous polarities in the two output windings, hence when the upper terminal (as viewed in the drawing) of winding 3 is made positive as during a change of flux in one direction in the core, and the induced voltage in the winding has a polarity which I shall term a first polarity, the upper terminal of winding 2 is likewise made positive and the induced voltage in the winding has a polarity which I shall term a second polarity, so that but for the asymmetrical units 17 and 18 a voltage of substantially zero magnitude would be impressed across the direct current load. However, asymmetrical unit 18 connected across the terminals of winding 3 is poled so that when the upper terminal of the winding is positive and the induced voltage is of the first polarity, the asymmetrical unit 18 provides a low resistance or shunt path for the current induced in the winding, while the other asymmetrical unit 17 connected across the terminals of winding 2 is poled so that when the upper terminal of that winding is positive and the induced voltage is of the second or opposite polarity, the asymmetrical unit 17 presents its high resistance direction to the flow of current between the terminals through the rectifier. It is apparent that since a relatively heavy load is placed on winding 3 while a relatively light load is placed on winding 2, the reluctances of the parallel legs 6 and 8 are unbalanced and a larger proportion of the flux due to current in winding 5 is caused to thread leg 6 than is caused to thread leg 8. The voltage induced in winding 2 accordingly is caused to have a larger value than that induced in winding 3, and is impressed across asymmetrical unit 18 in its low resistance direction so as to cause the lower terminal of winding 3 to be positive with respect to the lower terminal of winding 2. This voltage is, of course, impressed across condenser 10 and relay CR in series, thereby applying to the condenser a charging current having a polarity opposite to that to which the control relay responds. The charging current accordingly charges the condenser but does not cause operation of relay CR.

When the polarities of the voltages induced in the windings 2 and 3 are reversed due to a reversal of the flux direction in the core, current of the first polarity is induced in winding 2 and is shunted by asymmetrical unit 17 in its low resistance direction, thus causing the flux due to current in winding 5 to shift toward leg 8 and causing a relatively higher voltage to be induced in winding 3. This voltage, impressed across condenser 10 and relay CR through asymmetrical unit 17 in its low resistance direction, causes the lower terminal of winding 3 to be positive with respect to the lower terminal of winding 2, hence the charging current supplied to the condenser during this portion of the cycle of flux in the transformer is of the same polarity as that of the current supplied by winding 2 to the condenser during the other half of the cycle of flux in the transformer. It can be seen that the asymmetrical units 17 and 18 are poled so that unit 18 shunts its associated winding 3 when current of a preselected one polarity is induced in that winding, and unit 17 shunts its associated winding 2 when current of the same or of the preselected one polarity is induced in such winding. It follows that the units are poled to provide a shunt path for current of a given polarity induced in either output winding, hence the output windings are alternately shunted and unidirectional current having a polarity opposite to that of the preselected polarity is supplied from the transformer winding to the direct current load.

A condenser 19 may be connected across the two lower or output terminals of windings 2 and 3, as shown, for suppressing ripples.

The apparatus embodying my invention operates in the following manner: Winding 5 is normally energized by current periodically varied or pulsed at a rate corresponding to the rate of rotation of shaft 15. Reactor 12 is selected and adjusted to compensate for the non-linear characteristics of the asymmetrical units, thus causing the transformer-rectifier combination to apply to the direct current load a potential substantially corresponding to the rate of rotation of shaft 15.

When this potential is initially applied, it builds up a charge on condenser 10 and during this period current flows in the circuit including relay CR in the direction opposite that to which the relay is responsive so that the relay does not pick up. After the charge on condenser 10 builds up to a steady-state value, the condenser then functions to block the flow of current in the circuit of relay CR but the applied potential of course maintains the charge on the condenser.

If, now, there is a decrease in the voltage available at the transformer output windings, condenser 10 begins to discharge through a circuit comprising relay CR and output windings 2 and 3 in series. The current supplied from condenser 10 under the assumed conditions is opposite in polarity to that of the charging current and is of proper polarity to cause response of relay CR. This relay is adjusted to pick up should the voltage available at the transformer decrease abnormally, as for example when there is a failure of the source or when shaft 15 abruptly ceases to rotate.

It is readily apparent from the foregoing that when there is a failure of the source of periodically varying or alternating energy supplying unidirectional energy through the rectifying means to the energy storing device, the device is permitted to discharge freely through the relatively low resistance windings 2 and 3, and the asymmetrical units in their high resistance directions are ineffective to impede the discharge of the device. It follows, therefore, that apparatus embodying my invention provides means arranged to obviate the use of a resistor connected in parallel with the device to provide a discharge path for the stored energy.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination with a source of periodically varying current, a condenser, an electroresponsive device responsive to current of a given relative polarity only, a transformer comprising a magnetizable core having two magnetic circuits each including a common portion of the core, a supply winding disposed on said common core portion and connected to said current source, a pair of output windings disposed one on each of said magnetic circuits of said core, a circuit connecting said condenser in series with said electroresponsive device across said output windings in series, said windings being arranged so that voltages having opposite instantaneous polarities are induced in said windings due to current in said supply winding, and two asymmetrical units one connected in multiple with each of said output windings in said circuit, said units being poled to provide a shunt path for current of said given polarity induced in either output winding.

2. In combination, a relay responsive only to unidirectional current having a given relative polarity, a capacitor connected in series circuit with said relay, and means for applying a unidirectional voltage of said opposite relative polarity to said circuit, comprising a pair of windings carrying alternating current and connected in series opposition to said circuit for applying thereto voltages of opposite instantaneous polarities, and two asymmetrical units one connected in multiple with each of said windings, said units being poled to provide a shunt path for current of said given relative polarity in either of said windings, whereby a unidirectional voltage of said opposite relative polarity will be supplied to said circuit as long as said windings carry alternating current and upon failure of such current said capacitor will be enabled to discharge through said windings to energize said relay with current having said given polarity to which said relay is responsive.

3. In combination, a relay responsive only to unidirectional current having a given relative polarity, a capacitor connected in series circuit with said relay, and means for applying a unidirectional voltage of said opposite relative polarity to said circuit, comprising a pair of windings carrying alternating current and connected in series opposition to said circuit for applying thereto voltages of opposite instantaneous polarities, and two asymmetrical units one connected in multiple with each of said windings, said units being poled to provide a shunt path for current of said given relative polarity in either of said windings, whereby a unidirectional voltage of said opposite relative polarity will be supplied to said circuit as long as said windings carry alternating current and upon an abrupt failure of such current said capacitor will be enabled to discharge through said windings to energize said relay with current having said given polarity to which said relay is responsive.

4. In combination, a capacitor, a relay responsive only to unidirectional current having a given relative polarity, and a transformer-rectifier combination comprising a transformer having an input winding supplied with periodically varying current for inducing alternating currents in two output windings connected in series opposition to said capacitor and relay in series, and asymmetrical units one for each output winding interposed in said connection and arranged to apply a unidirectional voltage of the opposite relative polarity to said capacitor and relay without impeding the discharge of current of said given relative polarity from said capacitor to said relay through said windings should the supply of current to said input winding be terminated.

ANDREW J. SORENSEN.